United States Patent
Gogic (10) Patent No.: US 8,688,129 B2
(45) Date of Patent: Apr. 1, 2014

(54) GRADE OF SERVICE (GOS) DIFFERENTIATION IN A WIRELESS COMMUNICATION NETWORK

(75) Inventor: Aleksandar Gogic, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 975 days.

(21) Appl. No.: 12/211,724

(22) Filed: Sep. 16, 2008

(65) Prior Publication Data

US 2009/0075665 A1 Mar. 19, 2009

Related U.S. Application Data (60) Provisional application No. 60/973,137, filed on Sep. 17, 2007.

(51) Int. Cl.
*H04Q 7/20* (2006.01)

(52) U.S. Cl.
USPC ........ 455/445; 455/564; 455/414.1; 455/446; 455/565; 455/567; 370/328; 370/329; 370/341

(58) Field of Classification Search
USPC .......................... 455/415, 418, 419, 420, 423
See application file for complete search history.

(56) References Cited

U.S. PATENT DOCUMENTS

| | | | |
|---|---|---|---|
| 5,467,388 A * | 11/1995 | Redd et al. | 379/210.02 |
| 5,517,495 A | 5/1996 | Lund et al. | |
| 5,592,542 A | 1/1997 | Honda et al. | |
| 5,666,364 A * | 9/1997 | Pierce et al. | 370/455 |
| 6,167,057 A | 12/2000 | Kishigami et al. | |
| 6,324,166 B1 * | 11/2001 | Yokoyama et al. | 370/234 |
| 6,484,145 B1 | 11/2002 | Horne et al. | |
| 6,535,971 B1 | 3/2003 | Shirasawa et al. | |
| 6,546,017 B1 | 4/2003 | Khaunte | |
| 6,731,937 B1 * | 5/2004 | Spinner | 455/445 |
| 6,754,311 B1 | 6/2004 | Kampmeier et al. | |

(Continued)

FOREIGN PATENT DOCUMENTS

| | | |
|---|---|---|
| CA | 2145801 A1 | 12/1995 |
| CN | 1323502 A | 11/2001 |

(Continued)

OTHER PUBLICATIONS

International Search Report and Written Opinion—PCT/US2008/076719, International Searching Authority—European Patent Office, Mar. 17, 2009.

(Continued)

*Primary Examiner* — Charles Appiah
*Assistant Examiner* — Randy Peaches
(74) *Attorney, Agent, or Firm* — Howard Seo (57) ABSTRACT

Techniques for handling arriving calls with grade of service (GoS) differentiation for multiple tiers of services are described. The multiple tiers may be for different levels of service subscriptions, different types of calls, etc. In one design, calls in multiple tiers of services may be received by a base station. The calls in the multiple tiers may be differentiated based on at least one parameter. In one design, different blocking rates may be supported for calls in different tiers, e.g., with progressively lower blocking rates being supported for calls in progressively higher tiers. In another design, different call setup queuing delays may be supported for calls in different tiers, e.g., with progressively shorter queuing delays being supported for calls in progressively higher tiers.

17 Claims, 5 Drawing Sheets

(56) References Cited

U.S. PATENT DOCUMENTS

| | | |
|---|---|---|
| 6,834,053 B1 | 12/2004 | Stacey et al. |
| 6,865,169 B1 * | 3/2005 | Quayle et al. ............... 370/335 |
| 6,925,094 B2 | 8/2005 | Sharony et al. |
| 6,934,250 B1 | 8/2005 | Kejriwal et al. |
| 7,146,002 B1 * | 12/2006 | Smith et al. ............... 379/265.13 |
| 7,433,304 B1 | 10/2008 | Galloway et al. |
| 7,545,748 B1 | 6/2009 | Riddle |
| 7,619,969 B2 | 11/2009 | Lin |
| 7,620,054 B2 | 11/2009 | Katayama |
| 7,920,541 B2 * | 4/2011 | To et al. ............... 370/348 |
| 7,924,724 B2 * | 4/2011 | Johnson et al. ............... 370/236 |
| 2001/0030974 A1 | 10/2001 | Pauwels |
| 2002/0031086 A1 | 3/2002 | Welin |
| 2002/0141427 A1 | 10/2002 | McAlpine |
| 2003/0120795 A1 | 6/2003 | Reinshmidt |
| 2003/0198204 A1 | 10/2003 | Taneja et al. |
| 2003/0198209 A1 * | 10/2003 | Schwengler et al. ......... 370/342 |
| 2004/0111506 A1 | 6/2004 | Kundu et al. |
| 2005/0094628 A1 | 5/2005 | Ngamwongwattana et al. |
| 2005/0105488 A1 | 5/2005 | Raji et al. |
| 2005/0111361 A1 | 5/2005 | Hosein |
| 2005/0135243 A1 | 6/2005 | Lee et al. |
| 2005/0281278 A1 | 12/2005 | Black et al. |
| 2006/0029089 A1 | 2/2006 | Zellner et al. |
| 2006/0268906 A1 | 11/2006 | Kneckt |
| 2007/0047570 A1 | 3/2007 | Benveniste |
| 2007/0067296 A1 | 3/2007 | Malloy et al. |
| 2007/0104132 A1 | 5/2007 | Rajagopalan et al. |
| 2007/0201501 A1 | 8/2007 | Suzuki et al. |
| 2007/0263640 A1 | 11/2007 | Finn |
| 2007/0280111 A1 | 12/2007 | Lund |
| 2008/0034086 A1 | 2/2008 | Castelli et al. |
| 2008/0089364 A1 | 4/2008 | Barry et al. |
| 2008/0212514 A1 | 9/2008 | Chen |
| 2009/0080451 A1 | 3/2009 | Gogic |
| 2009/0116391 A1 | 5/2009 | Bakker et al. |
| 2009/0161540 A1 | 6/2009 | Zaki et al. |
| 2009/0182874 A1 | 7/2009 | Morford et al. |
| 2010/0014423 A1 | 1/2010 | Furuskar et al. |
| 2010/0177633 A1 | 7/2010 | Bader et al. |
| 2011/0103407 A1 | 5/2011 | Varier et al. |

FOREIGN PATENT DOCUMENTS

| | | |
|---|---|---|
| CN | 1729655 A | 2/2006 |
| EP | 1113645 A2 | 7/2001 |
| EP | 1331767 A1 | 7/2003 |
| JP | 02072755 | 3/1990 |
| JP | 5316562 A | 11/1993 |
| JP | 8097914 A | 4/1996 |
| JP | 8126040 A | 5/1996 |
| JP | 2000349786 A | 12/2000 |
| JP | 2001025048 A | 1/2001 |
| JP | 2002077383 A | 3/2002 |
| JP | 2002523989 A | 7/2002 |
| JP | 2003052074 | 2/2003 |
| JP | 2005333417 A | 12/2005 |
| JP | 2007096819 A | 4/2007 |
| JP | 2007184946 | 7/2007 |
| JP | 2009521831 A | 6/2009 |
| RU | 2160965 C2 | 12/2000 |
| RU | 2270526 | 2/2006 |
| WO | WO 9633584 A1 * | 10/1996 |
| WO | WO 9633584 A1 | 10/1996 |
| WO | WO9700583 A2 | 1/1997 |
| WO | WO 00011879 | 3/2000 |
| WO | WO2004066570 A1 | 8/2004 |
| WO | 2007073271 A1 | 6/2007 |

OTHER PUBLICATIONS

International Search Report and Written Opinion—PCT/US2008/076728, International Searching Authority—European Patent Office, Feb. 18, 2009.

Kaas R., et al.,"Design and Implementation of an Efficient Priority Queue", pp. 99-127, year 1977.

Randolph Nelson et al.,"Performance Analysis of Parallel Processing Systems", IEEE Transactions on Software Engineering, Vol. 14, No. 4, pp. 532- 540, Apr. 1988.

Choa H. J., "A Novel Architecture for Queue Management in the ATM Network," IEEE Journal on Selected Areas in Communications, vol. 9. No. 7, pp. 1110-1118, Sep. 1991.

Pang, J. W. M. et al., "Throughout Analysis of a Timer Controlled Token Passing Protocol under Heavy Load," IEEE Transactions on Communications, vol. 37, No. 7, pp. 694-702, Jul. 1989.

Seong, Dan-geun., "Electronic Switching System (Telephone Network and VoIP Network)", Kaist, 2001 Fall. pp. 1-34.

Taiwan Search Report—TW097135650—TIPO—Apr. 19, 2012.

* cited by examiner

GRADE OF SERVICE (GOS) DIFFERENTIATION IN A WIRELESS COMMUNICATION NETWORK

The present application claims priority to provisional U.S. Application Ser. No. 60/973,137, entitled "Resource Reservation and Queue Management in IP based Wireless Networks," filed Sep. 17, 2007, assigned to the assignee hereof and incorporated herein by reference.

BACKGROUND

I. Field

The present disclosure relates generally to communication, and more specifically to techniques for handling arriving calls in a wireless communication network.

II. Background

Wireless communication networks are widely deployed to provide various communication services such as voice, video, packet data, messaging, broadcast, etc. These networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may observe wide fluctuations in loading. For example, network loading may be heavy during morning and evening commute times, when a natural or man-made disaster occurs, etc. During peak usage, the limited capacity of the network may be unable to handle the large volume of arriving calls. It is desirable to effectively handle arriving calls in such scenarios.

SUMMARY

Techniques for handling arriving calls with grade of service (GoS) differentiation for multiple tiers of services are described herein. The multiple tiers may be for different levels of service subscriptions, different types of calls, etc. Calls in different tiers may observe different treatments by a network, e.g., different blocking rates, different call setup queuing delays, etc.

In one design, calls in multiple tiers of services may be received by a base station. The tier of each call may be determined based on a feature code dialed by a user, a resource priority header appended by a terminal, and/or other information. The calls in the multiple tiers may be differentiated based on at least one parameter. In one design, the at least one parameter may comprise blocking rate, and different blocking rates may be supported for calls in different tiers. For example, progressively lower blocking rates may be supported for calls in progressively higher tiers deemed to be more important. In another design, the at least one parameter may comprise call setup queuing delay, and different queuing delays may be supported for calls in different tiers. For example, progressively shorter queuing delays may be supported for calls in progressively higher tiers. Different blocking rates and/or different queuing delays for different tiers may be implemented in various manners, as described below.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as cdma2000, Universal Terrestrial Radio Access (UTRA), etc. cdma2000 covers IS-2000, IS-95 and IS-856 standards. UTRA includes Wideband CDMA (WCDMA) and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

Figure 1:
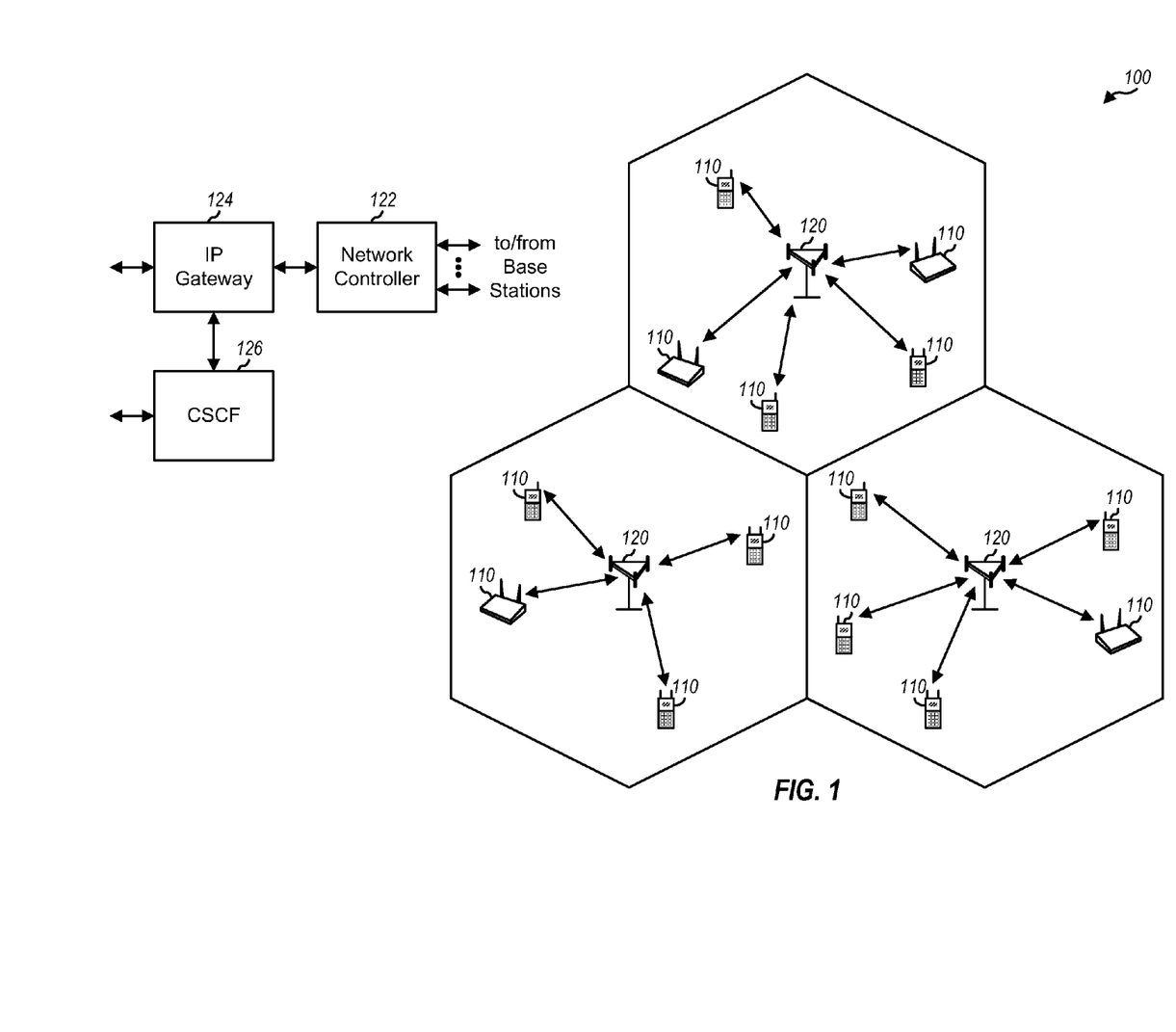
FIG. 1 shows a wireless communication network.

FIG. 1 shows a wireless communication network 100, which may include a number of base stations 120. A base station is generally a fixed station that communicates with terminals and may also be referred to as a Node B, an evolved Node B (eNB), an access point, a base transceiver station (BTS), etc. Each base station provides communication coverage for a particular geographic area. The coverage area of a base station may be partitioned into multiple (e.g., three) smaller areas. Each smaller area may be served by a respective base station subsystem. In 3GPP, the term "cell" can refer to the smallest coverage area of a base station and/or a base station subsystem serving this area, depending on the context in which the term is used. In 3GPP2, the term "sector" can refer to the smallest coverage area of a base station and/or a base station subsystem serving this area. For clarity, the concept of cell in 3GPP is used in the description below.

A network controller 122 may couple to a set of base stations and provide coordination and control for these base stations. An Internet Protocol (IP) gateway 124 may support data services for terminals and may be responsible for establishment, maintenance, and termination of data sessions for the terminals. IP gateway 124 may couple to other data network(s) such as a core network, private and/or public data networks, the Internet, etc. A Call Session Control Function (CSCF) 126 may support IP Multimedia Subsystem (IMS) services such as Voice-over-IP (VoIP). Network 100 may include other network entities not shown in FIG. 1.

Terminals 110 may be dispersed throughout the network, and each terminal may be stationary or mobile. A terminal may also be referred to as a mobile station, a user equipment, an access terminal, a subscriber unit, a station, etc. A terminal may be a cellular phone, a personal digital assistant (PDA), a wireless communication device, a wireless modem, a handheld device, a laptop computer, etc. A terminal may communicate with a base station via the forward and reverse links.

The forward link (or downlink) refers to the communication link from the base station to the terminal, and the reverse link (or uplink) refers to the communication link from the terminal to the base station. In the description herein, the terms "terminal" and "user" are used interchangeably. The terms "base station" and "cell" are also used interchangeably.

In an aspect, grade of service (GoS) differentiation for multiple tiers of services may be supported. The multiple tiers or priority levels may be determined based on service subscriptions of users, different types of calls, etc. Calls in different tiers may observe different treatments by the network. In one design, calls in different tiers may observe different blocking rates. For example, calls in progressively higher tiers may observe progressively lower blocking rates. Blocking rate is the probability of a call being blocked due to network overloading. In another design, calls in different tiers may observe different call setup queuing delays for network access. For example, calls in progressively higher tiers may observe progressively shorter delays. Different combinations of blocking rates and queuing delays may also be supported for calls in different tiers.

Calls may be classified into tiers in various manners. In one design, different tiers may be defined based on service subscriptions. For example, users with premium subscriptions may be placed in a high tier, users with basic subscriptions may be placed in a low tier, etc. In another design, emergency calls may be placed in a high tier, and normal calls may be placed in a low tier. Emergency calls may include calls placed by users in emergency (e.g., users dialing "911"), calls placed by emergency assistance personnel (e.g., police, fire fighters, and ambulance personnel), etc. Calls may also be classified into more than two tiers and/or based on other factors.

GoS differentiation may be used to improve performance of higher tier calls and/or to improve cell capacities. The improvements with GoS differentiation may be illustrated by an example design. In this example design, a cell is designed to handle 10,000 calls per hour with an average call duration of 2 minutes. For a baseline case with no GoS differentiation, the target blocking rate is 2%, and all calls have equal probability of being blocked 2% of the time during busy hour. Each call may be assigned one traffic channel, and a total of 348 traffic channels may be used to obtain the target blocking rate of 2%.

The cell capacity for the example design described above can support different numbers of arriving calls for different blocking rates. Table 1 gives the number of arriving calls that can be supported for blocking rates of 1, 2, 5 and 10%. Table 1 assumes that 348 traffic channels are available and that the average call duration is 2 minutes. The numbers of calls in Table 1 are obtained using statistical analysis methodology that is commonly accepted in the industry.

TABLE 1

| | Blocking rate (%) | | | |
|---|---|---|---|---|
| | 1% | 2% | 5% | 10% |
| Arriving calls per hour | 9,725 | 10,000 | 10,580 | 11,345 |

Figure 2:
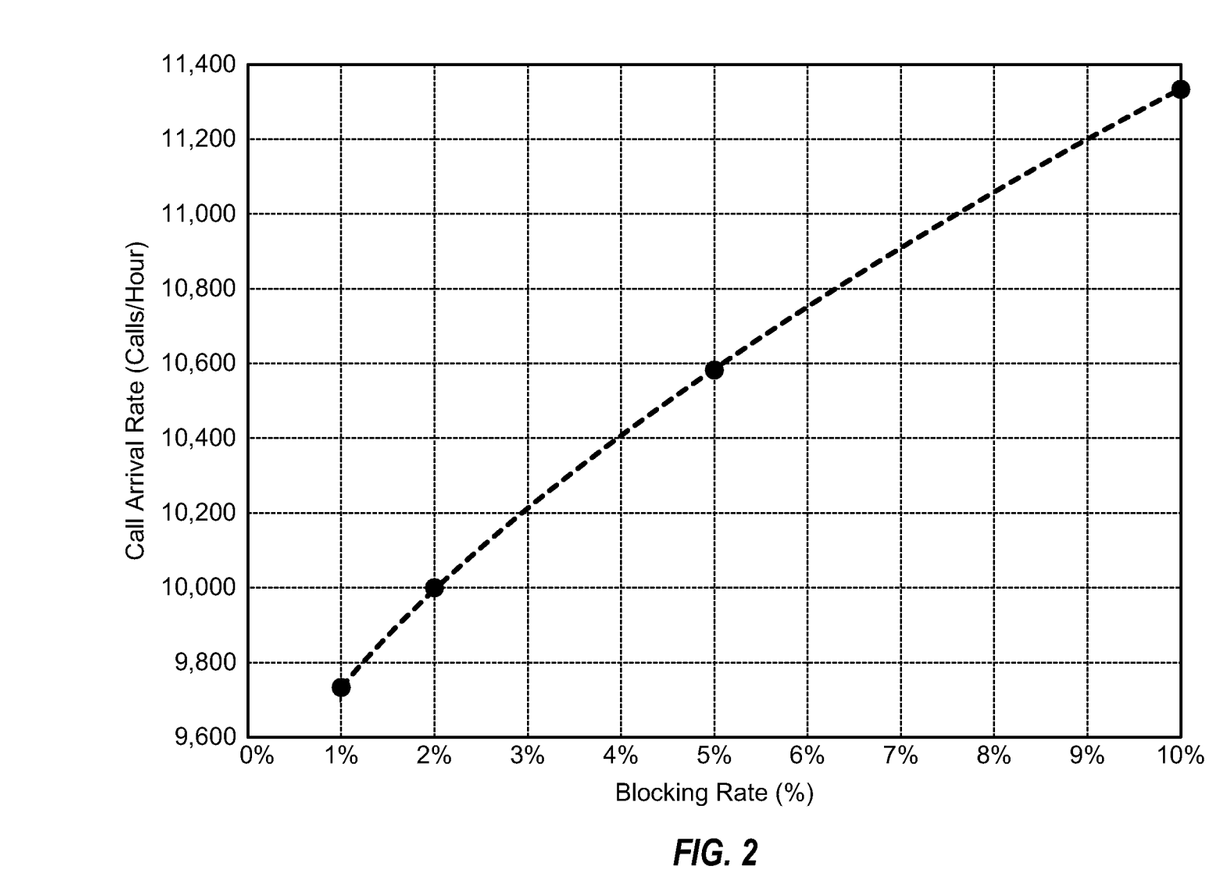
FIG. 2 shows a plot of call arrival rate versus blocking rate.

FIG. 2 shows a plot of call arrival rate versus blocking rate for the example described above and given in Table 1. FIG. 2 suggests that a function of call arrival rate versus blocking rate falls between a linear function and a logarithmic function.

GoS differentiation for multiple tiers may be supported in various manners. In general, the cell capacity may be allocated to any number of tiers, and each tier may be allocated any fraction of the cell capacity. The number of arriving calls that can be supported for each tier may be dependent on (i) the fraction of the cell capacity allocated to that tier and (ii) the blocking rate for the tier.

Table 2 shows an example in which two tiers (a high tier and a low tier) are supported. In this example, 20% of the cell capacity may be used for arriving calls in the high tier with 2% blocking rate, and the remaining 80% of the cell capacity may be used for arriving calls in the low tier with 10% blocking rate. In this example, the cell capacity can support 2000 arriving calls in the high tier, 9076 arriving calls in the low tier, and 11,076 total arriving calls in the two tiers. This represents an increase of approximately 10% over the baseline case of 2% blocking rate for all arriving calls. The values in Table 2 were obtained based on an assumption of near linear relationship in the vicinity of the baseline case.

TABLE 2

| Tier | Fraction of cell capacity | Blocking rate (%) | Arriving calls per hour | Call/hour/ user | Number of users |
|---|---|---|---|---|---|
| High tier | 20% | 2% | 2,000 | 1.0 | 2,000 |
| Low tier | 80% | 10% | 9,076 | 0.3 | 30,253 |
| Total | 100% | | 11,076 | | 32,253 |

Users in different tiers may have different utilization, which may affect the number of users that can be supported. For example, each user in the high tier may generate one call per hour on average whereas each user in the low tier may generate 0.3 calls per hour on average. In this case, the cell capacity can support 2000 users in the high tier, 30,253 users in the low tier, and 32,253 total users in the two tiers. In contrast, the baseline case may support 2000 users in the low tier with 2% blocking rate, 26,667 users in the low tier also with 2% blocking rate, and 28,667 total users in the two tiers. A gain of approximately 12.5% may be realized with GoS differentiation in the example given above.

Table 3 shows an example in which three tiers (a high tier, a mid tier, and a low tier) are supported. In this example, 20% of the cell capacity may be used for arriving calls in the high tier with 1% blocking rate, 30% of the cell capacity may be used for arriving calls in the mid tier with 2% blocking rate, and the remaining 50% of the cell capacity may be used for arriving calls in the low tier with 10% blocking rate. In this example, the cell capacity can support 1950 arriving calls in the high tier, 3000 arriving calls in the mid tier, 5672 arriving calls in the low tier, and 10,622 total arriving calls in the three tiers. The last column of Table 3 shows the number of users that can be supported in each tier assuming that users in the high, mid and low tiers generate 1.0, 0.5 and 0.3 calls per hour, respectively, on average.

TABLE 3

| Tier | Fraction of cell capacity | Blocking rate (%) | Arriving calls per hour | Call/hour/ user | Number of users |
|---|---|---|---|---|---|
| High tier | 20% | 1% | 1,950 | 1.0 | 1,950 |
| Mid tier | 30% | 2% | 3,000 | 0.5 | 6,000 |
| Low tier | 50% | 10% | 5,672 | 0.3 | 18,906 |
| Total | 100% | | 10,622 | | 26,856 |

Tables 2 and 3 illustrate two examples of GoS differentiation for multiple tiers based on blocking rate. Different tiers may be associated with different blocking rates. Each tier may also be allocated a particular fraction of the cell capacity. The number of calls and the number of users that can be supported in each tier may be dependent on the blocking rate for that tier and the fraction of the cell capacity allocated to the tier. A tradeoff between user performance and cell capacity may be flexibly made by assigning an appropriate blocking rate to each tier and allocating a suitable fraction of cell capacity to each tier.

In another design, GoS differentiation for multiple tiers may be performed based on call setup queuing delay. In this design, progressively higher tiers may be associated with progressively shorter queuing delays when the network is congested. In yet another design, GoS differentiation for multiple tiers may be performed based on both blocking rate and queuing delay. In this design, progressively higher tiers may be associated with progressively smaller blocking rates and progressively shorter queuing delays.

In general, GoS differentiation for multiple tiers may be performed based on blocking rate, call setup queuing delay, and/or other parameters. GoS differentiation may allow the network to support different tiers or categories of calls/users, which may have different performance characteristics and/or requirements. GoS differentiation may allow the network to appropriately allocate the cell capacity to serve more calls/users with different performance characteristics and/or requirements.

GoS differentiation may be implemented in various manners. In one design, GoS differentiation for two tiers may be implemented as follows. When a new call arrives and no traffic channels are available, the call may be blocked immediately if it is in the low tier. Otherwise, if the call is in the high tier, then it may be placed in a queue until a traffic channel becomes available. The call arrival rate may be approximately the same as the call departure/termination rate. Hence, a traffic channel may become available within a fraction of a second, e.g., approximately every 350 ms on average for the example design described above for Table 1. The call at the head of the queue may be assigned the next available traffic channel. The queue may be maintained up to a maximum queuing time. For example, up to three seconds may be considered to be acceptable for call setup time, and the maximum queuing time may then be equal to three seconds. An arriving call in the high tier may be blocked immediately if the expected queuing delay for the call is more than the maximum queuing time. An effective blocking rate for the high tier may be adjusted by varying the maximum queuing time. A longer maximum queuing time may result in a smaller effective blocking rate (which may be desirable) but may also take longer to inform a user whether or not an arriving call has been blocked (which may be undesirable).

In one design, GoS differentiation for two or more tiers may be implemented with selective blocking as follows. For tier m, one in every $N_m$ arriving calls may be blocked when the network becomes congested and the cell loading is $L_m$ % or more of the cell capacity, where m=1, 2, . . . , M, and M is the number of tiers. Tier 1 may be the highest tier with the highest priority, and tier M may be the lowest tier with the lowest priority. Parameter $N_m$ may be defined such that $N_1 \geq N_2 \geq \ldots \geq N_M$, which may result in progressively fewer blocked calls for progressively higher tiers. Parameter $L_m$ may be defined such that $L_1 \geq L_2 \geq \ldots \geq L_M$, which may result in blocking being performed progressively later for progressively higher tiers. Parameters $N_m$ and $L_m$ may be selected for each tier m to obtain the desired blocking rate for that tier. Arriving calls in each tier may be selectively blocked based on parameters $N_m$ and $L_m$. The unblocked calls in all tiers may be placed in a queue in the order of their arrivals. Whenever a traffic channel becomes available, the call at the head of the queue may be assigned the traffic channel. This design may result in different blocking rates for calls in different tiers but may result in similar call setup queuing delays for all calls.

In another design, GoS differentiation for two or more tiers may be implemented with variable call setup queuing delays as follows. M queues may be maintained for M tiers, one queue for each tier. Arriving calls in tier m may be (i) placed in the queue for tier m if the expected queuing delay is less than a maximum queuing delay $D_m$ for tier m or (ii) blocked otherwise. Parameter $D_m$ may be defined such that $D_1 \leq D_2 \leq \ldots \leq D_M$, which may result in calls in progressively higher tiers being blocked progressively less. Parameter $D_m$ may be selected for each tier to obtain the desired blocking rate for that tier. The unblocked calls in all tiers may be assigned traffic channels in various manners. In one design, the unblocked calls may be assigned traffic channels based on their order of arrival. In another design, the M queues may be serviced in a round robin manner, and calls in the queues may be assigned traffic channels when served. In yet another design, calls in higher tier queues may be assigned traffic channels earlier than calls in lower tier queues. The unblocked calls may also be assigned traffic channels in other manners.

Figure 3:
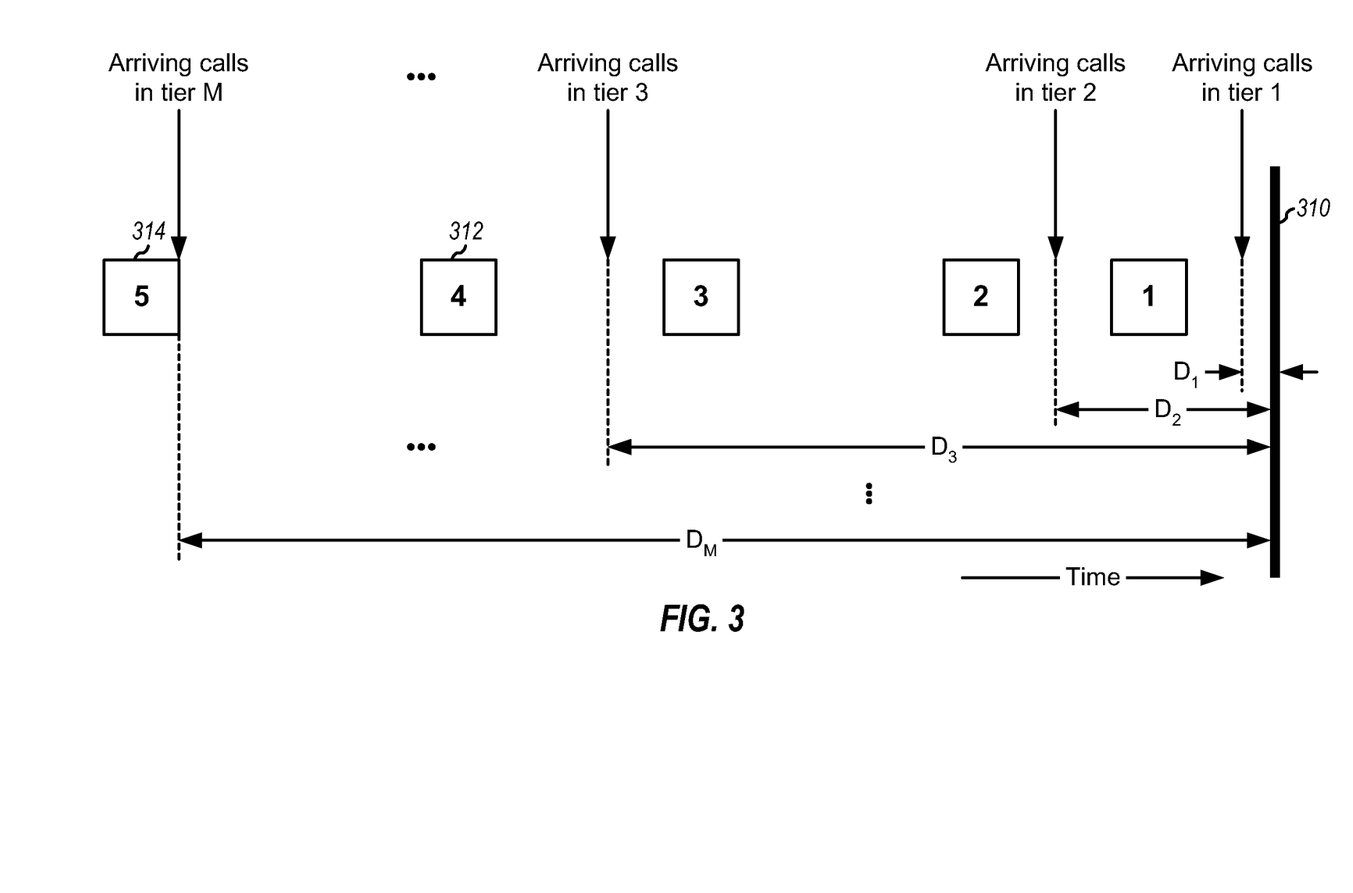
FIG. 3 shows priority scheduling for arriving calls in multiple tiers.

FIG. 3 shows a design of priority scheduling for arriving calls in M tiers. In this design, a single queue may store arriving calls in all M tiers. However, arriving calls in different tiers may be placed at different points in the queue instead of at the end of the queue. FIG. 3 shows a snapshot of the queue at a specific time instant. In FIG. 3, the horizontal axis represents time. The calls in the queue are represented by a row of boxes, with each box representing one call. In the example shown in FIG. 3, five calls are present in the queue and are labeled 1 through 5. The head of the queue is the rightmost box, and the back of the queue is the leftmost box. A vertical line 310 may represent the call setup deadline for the calls in the queue.

In the design shown in FIG. 3, tier m may have a call setup queuing delay of $D_m$, for m=1, 2, . . . , M. Arriving calls in tiers 1 through M may be placed at different points in the queue, commensurate with their priority levels, such that these calls can achieve the target queuing delays of $D_1$ through $D_M$, respectively. When an arriving call is received, the tier of the call may be determined, and the call may be placed at the proper point in the queue based on its tier. With passage of time, the calls in the queue move from left to right in FIG. 3 and approach their call setup deadlines at vertical line 310. The distance from the leading/right edge of each box to vertical line 310 is the amount of time left to the call setup deadline.

The calls in the queue may be assigned traffic channels in a first-in-first-out (FIFO) manner. Whenever a traffic channel becomes available, it may be assigned to the call at the head of the queue. If a cell is lightly loaded, then arriving calls may be assigned traffic channels soon after they are received by the cell. For example, call 312 may be assigned a traffic channel by the time call 314 is received. Thus, the number of calls waiting in the queue may be low, and much of the space between the oldest call and the call setup deadline at vertical line 310 may be empty.

As the cell becomes congested, the queuing delays of the calls increase, and the space between vertical line 310 and the end of the queue may fill up. A scheduler may attempt to maintain the queuing delays of the calls within their call setup delay requirements and may attempt to assigned a traffic channel to each call before the call goes past its call setup deadline at vertical line 310. In one design, arriving calls may be placed in the queue and assigned traffic channels when they become available. In this design, no calls are blocked, the queuing delays are dependent on the loading of the cell. In another design, arriving calls may be blocked if their queuing delays exceed their call setup delay requirements. In this design, an arriving call may be blocked if it is not assigned a traffic channel by the time it reaches vertical line 310.

Several example designs of GoS differentiation for multiple tiers have been described above. GoS differentiation may be achieved with different blocking rates for different tiers, different call setup queuing delays for different tiers (e.g., as shown in FIG. 3), or both different blocking rates and different queuing delays for different tiers. GoS differentiation for multiple tiers may also be performed based on other parameters instead of, or in addition to, blocking rate and queuing delay.

Arriving calls in different tiers may be identified in various manners. In one design, arriving calls in different tiers may be identified by different feature codes. A feature code is a set of one or more digits dialed by a user before dialing the area code and telephone number. For example, Government Emergency Telecommunications Service (GETS) defines a feature code of "*272" to indicate priority for National Security/Emergency Preparedness (NS/EP) personnel. A user may place a GETS call by dialing "*272" followed by the phone number. A network entity such as CSCF 126 may recognize the "*272" feature code and may determine whether the user is authorized to place the GETS call. If the user is authorized, then the network entity may affix a resource priority header (RPH) to Session Initiation Protocol (SIP) packets for the call in order to request priority call processing for these SIP packets. Other priority mechanisms (e.g., Diffserv for IP packets) may be subsequently set up for transport of media for the priority call. The GETS feature code may be used to indicate a high priority tier. Other feature codes may also be defined for other tiers.

In another design, a terminal may generate and append a resource priority header to a call originated by the terminal. The resource priority header may be for a tier assigned to the terminal (e.g., based on service subscription) or the type of call being made (e.g., for emergency service). End-to-end priority handling may be achieved for the call based on the attached resource priority header, without requiring the user to affix "*272" or some other feature code. Calls in different tiers may also be identified in other manners.

For all designs described above, a call for a higher tier may be recognized, authenticated and authorized, e.g., based on subscription information stored in a Home Subscriber Server (HSS) for a user originating the call. If the higher tier is valid for the user, then the call may be processed with priority and may observe a lower blocking rate and/or a shorter call setup queuing delay. Conversely, if the higher tier is not valid for the user, then the call may be revoked or moved to an appropriate tier, accounting measures may be taken, etc.

The GoS differentiation techniques described herein may be used to provide different tiers of services, e.g., in terms of blocking rate, call setup queuing delay, etc. The techniques may be used for different types of calls, e.g., emergency calls, normal calls, etc. The techniques may also be used to differentiate between users, e.g., based on different levels of service subscriptions.

The techniques may be used in combination with pricing plans that discourage low tier users from accessing the network during busy time. These low tier users may have a limited number of anytime minutes and may be motivated to decrease use during daytime on weekdays. Conventionally, these low tier users have the same blocking rates as high tier users whenever the low tier users decide to place calls. The techniques described herein allow for GoS differentiation between low and high tier users in order to provide high tier users with higher level of service.

Figure 4:
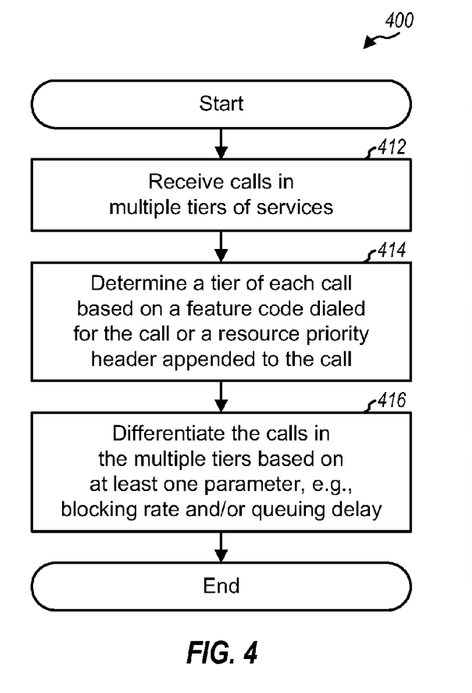
FIG. 4 shows a process for handing calls.

FIG. 4 shows a design of a process 400 for handing calls in a wireless communication network. Process 400 may be performed by a base station or some other network entity. Calls in multiple tiers of services may be received (block 412). The multiple tiers may be determined based on different levels of service subscriptions, different types of calls, etc. The tier of each call may be determined based on a feature code dialed for the call, a resource priority header appended to the call, and/or other information (block 414). The calls in the multiple tiers may be differentiated based on at least one parameter (block 416).

In one design of block 416, the at least one parameter may comprise blocking rate, and different blocking rates may be supported for calls in different tiers. For example, progressively lower blocking rates may be supported for calls in progressively higher tiers. In one design, calls in a low tier may be selectively blocked based on cell loading. For example, one call out of every N calls in the low tier may be blocked if the cell loading exceeds a predetermined threshold, where N may be one or greater. In another design, calls in the low tier may be blocked if resources (e.g., traffic channels) are not available, and calls in a high tier may be placed in a queue if resources are not available. The calls in the queue may be assigned resources when the resources become available.

In another design of block 416, the at least one parameter may comprise queuing delay, and different queuing delays may be supported for calls in different tiers. For example, progressively shorter queuing delays may be supported for calls in progressively higher tiers. In one design, the calls in the multiple tiers may be placed at different points in a queue, with progressively higher tiers being associated with points progressively closer to the head of the queue. The queuing delay for the calls in each tier may be determined based on a target blocking rate for that tier.

Figure 5:
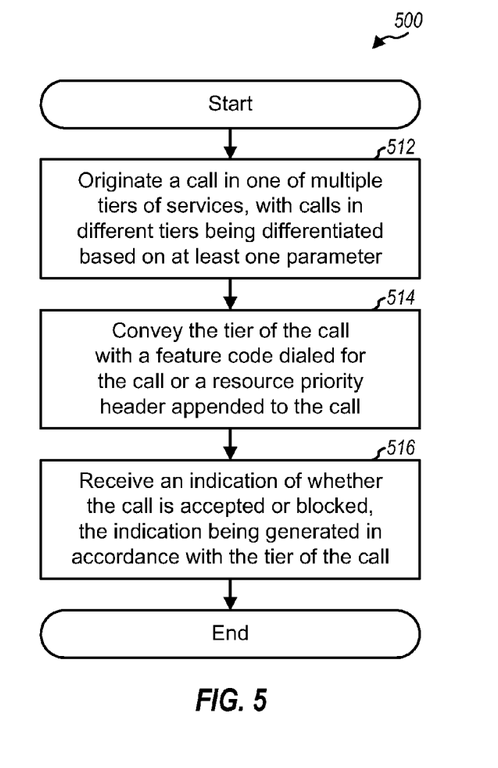
FIG. 5 shows a process for placing a call.

FIG. 5 shows a design of a process 500 for placing a call in a wireless communication network. Process 500 may be performed by a terminal or some other entity. A call in one of multiple tiers of service may be originated, with calls in different tiers being differentiated based on at least one parameter (block 512). The tier of the call may be conveyed with a feature code dialed for the call, a resource priority header appended to the call, and/or other information (block 514). An indication of whether the call is accepted or blocked may be received, with the indication being generated in accordance with the tier of the call (block 516). In one design, the at least one parameter may comprise blocking rate, and calls in different tiers may be differentiated based on different blocking rates. The likelihood of the originated call being blocked may be determined by the blocking rate for the tier of the call. In another design, the at least one parameter may comprise queuing delay, and calls in different tiers may be differentiated based on different queuing delays. The expected queuing delay for the originated call may be determined by the target queuing delay for the tier of the call.

Figure 6:
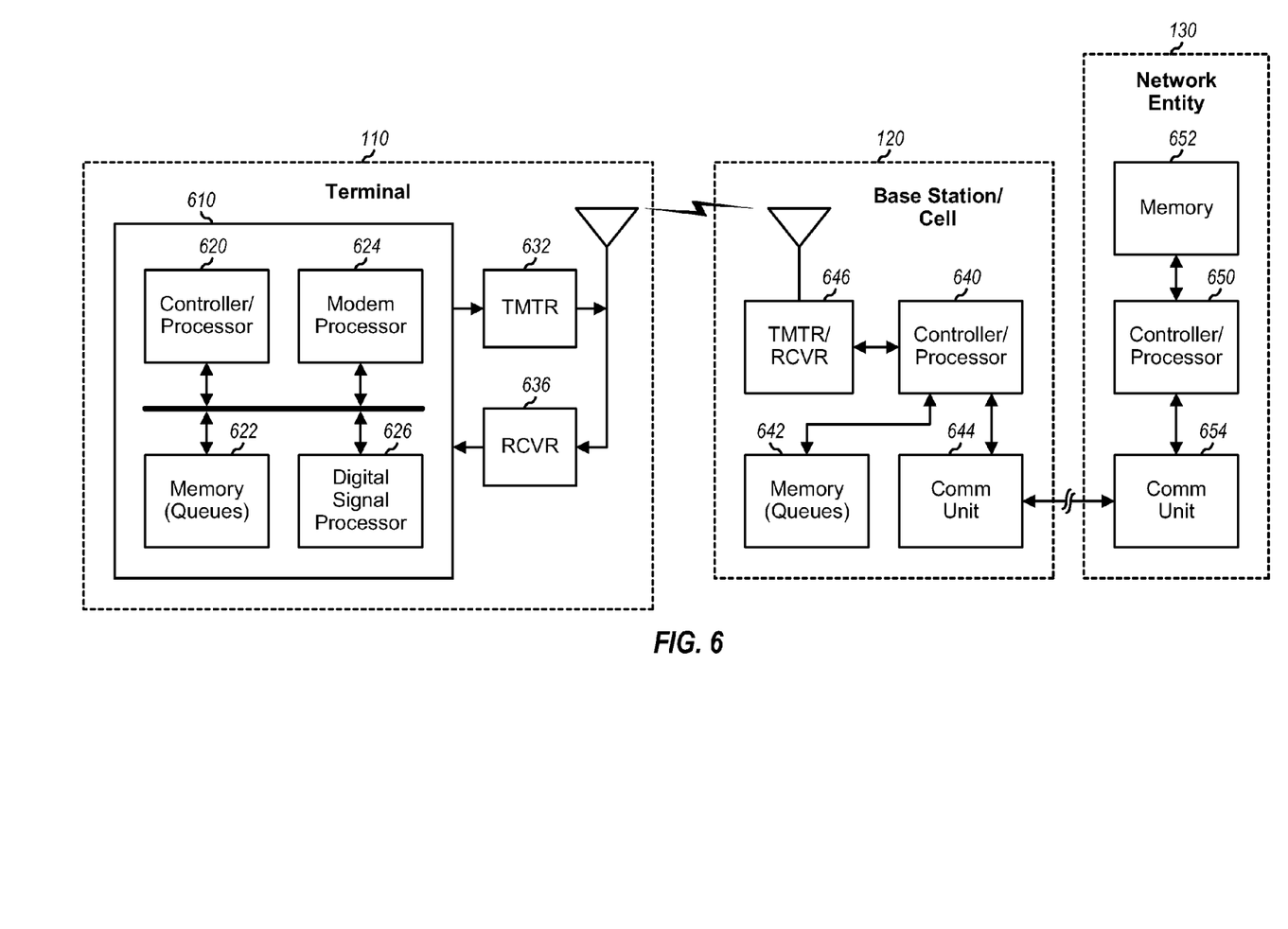
FIG. 6 shows a block diagram of a terminal, a base station, and a network entity.

FIG. 6 shows a block diagram of a design of a terminal 110, a base station 120, and a network entity 130. At terminal 110, a modem processor 624 may receive data to be sent by the terminal, process (e.g., encode, modulate, spread and scramble) the data, and generate output samples. A transmitter (TMTR) 632 may condition (e.g., convert to analog, filter, amplify, and frequency upconvert) the output samples and generate a reverse link signal, which may be transmitted to base station 120. On the forward link, terminal 110 may receive forward link signals from base station 120 and/or other base stations. A receiver (RCVR) 636 may condition (e.g., filter, amplify, frequency downconvert, and digitize) a received signal and provide samples. Modem processor 624 may process (e.g., demodulate and decode) the samples and provide decoded data. Modem processor 624 may perform processing in accordance with a radio technology (e.g., CDMA 1X, HRPD, WCDMA, GSM, etc.) utilized by the network.

A controller/processor 620 may direct the operation at terminal 110. Controller/processor 620 may perform or direct process 500 in FIG. 5 and/or other processes for the techniques described herein. A memory 622 may store program codes and data for terminal 110. A digital signal processor 626 may perform various types of processing for terminal 110. Processors 620, 624 and 626 and memory 622 may be implemented on an application specific integrated circuit (ASIC) 610. Memory 622 may also be implemented external to the ASIC.

At base station 120, transmitter/receiver (TMTR/RCVR) 646 may support radio communication with terminal 110 and/or other terminals. A controller/processor 640 may perform various functions for communication with the terminals. Controller/ processor 640 may also perform or direct process 400 in FIG. 4 and/or other processes for the techniques described herein. A memory 642 may store program codes and data for base station 120 and may implement one or more queues for one or more tiers. A communication (Comm) unit 644 may support communication with other network entities, e.g., network entity 130. In general, base station 120 may include any number of controllers, processors, memories, transmitters, receivers, communication units, etc.

Network entity 130 may be network controller 122, IP gateway 124, or CSCF 126 in FIG. 1 or may be some other network entity. Within network entity 130, a controller/processor 650 may perform various functions to support various services for terminals. A memory 652 may store program codes and data for network entity 130. A communication unit 654 may support communication with other network entities, e.g., base station 120. In general, network entity 130 may include any number of controllers, processors, memories, communication units, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving calls in multiple tiers of services, each call associated with a priority level of service,
   the priority levels of service differentiated by different blocking rates, wherein each tier of service has a corresponding target queuing delay for a call setup; and
   placing an arriving call at a point in a queue commensurate with its associated priority level of service to achieve its corresponding target queuing delay.

2. The method of claim 1, further comprising differentiating the calls in different priority levels of service by providing progressively lower blocking rates for calls in progressively higher priority levels of service.

3. The method of claim 1, further comprising differentiating the calls in different priority levels of service by selectively blocking calls in a low priority level of service based on cell loading.

4. The method of claim 1, further comprising selectively blocking calls by blocking one call out of every N(m) calls, where m is an index to denote a specific tier.

5. The method of claim 1, further comprising differentiating the calls in different priority levels of service by
   blocking a first call in a low priority level of service if resources are not available for the first call,
   placing a second call in a high priority level of service in a queue if resources are not available for the second call, and
   assigning resources to the second call when the resources become available.

6. The method of claim 1, wherein the target queuing delays are progressively shorter for calls in progressively higher priority levels of service.

7. The method of claim 1, further comprising differentiating the calls in different priority levels of service by determining a maximum queuing delay for calls in each priority level of service based on a target blocking rate for the priority level of service.

8. The method of claim 1, further comprising:
   determining a priority level of service of each call based on a feature code dialed for the call or a resource priority header appended to the call.

9. The method of claim 1, wherein the multiple tiers are for different levels of service subscriptions.

10. The method of claim 1, wherein the multiple tiers are for different types of calls.

11. An apparatus for wireless communication, comprising:
    at least one processor configured to receive calls in multiple tiers of services, each call associated with a priority level of service, the priority levels of service differentiated by different blocking rates, wherein each tier of service has a corresponding target queuing delay for a call setup, and to place an arriving call at a point in a queue commensurate with its associated priority level of service to achieve its corresponding target queuing delay.

12. The apparatus of claim 11, wherein the at least one processor is configured to differentiate calls in different tiers based on different blocking rates.

13. The apparatus of claim 11, wherein the at least one processor is configured to determine a priority level of service of each call based on a feature code dialed for the call or a resource priority header appended to the call.

14. An apparatus for wireless communication, comprising:
    means for receiving calls in multiple tiers of services, each call associated with a priority level of service,
    the priority levels of service differentiated by different blocking rates, wherein each tier of service has a corresponding target queuing delay for a call setup; and
    means for placing, the means for placing to place an arriving call at a point in a queue commensurate with its associated priority level of service to achieve its corresponding target queuing delay.

15. The apparatus of claim 14, wherein the means for placing comprises means for differentiating calls in different priority levels of service based on different blocking rates.

16. The apparatus of claim 14, further comprising:
    means for determining a priority level of service of each call based on a feature code dialed for the call or a resource priority header appended to the call.

17. A non-transitory computer program product, comprising:
    a non-transitory computer-readable medium comprising:
       code for causing at least one computer to receive calls in multiple tiers of services, each call associated with a priority level of service,
       the priority levels of service differentiated by different blocking rates, wherein each tier of service has a corresponding target queuing delay for a call setup; and
       code for placing an arriving call at a point in a queue commensurate with its associated priority level of service to achieve its corresponding target queuing delay.

* * * * *